US012583246B2

(12) United States Patent
    Takakusa et al.

(10) Patent No.: US 12,583,246 B2
(45) Date of Patent: Mar. 24, 2026

(54) PRINTING APPARATUS AND METHOD FOR FORMING PRINTED IMAGES HAVING GLOSSINESS

(71) Applicant: RISO KAGAKU CORPORATION, Tokyo (JP)

(72) Inventors: Tadashi Takakusa, Tokyo (JP); Shoji Naramoto, Tokyo (JP)

(73) Assignee: RISO KAGAKU CORPORATION, Tokyo (JP)

( * ) Notice: Subject to any disclaimer, the term of this patent is extended or adjusted under 35 U.S.C. 154(b) by 566 days.

(21) Appl. No.: 18/102,988

(22) Filed: Jan. 30, 2023

(65) Prior Publication Data

US 2023/0256766 A1    Aug. 17, 2023

(30) Foreign Application Priority Data

Feb. 17, 2022    (JP) ................................. 2022-022825
Nov. 29, 2022    (JP) ................................. 2022-189926

(51) Int. Cl.
    *B41M 7/00*       (2006.01)
    *B41J 2/205*      (2006.01)
    *B41J 2/21*       (2006.01)
    *B41J 11/00*      (2006.01)
    *H04N 1/54*       (2006.01)
(52) U.S. Cl.
    CPC .......... *B41M 7/0027* (2013.01); *B41J 2/2054* (2013.01); *B41J 2/2114* (2013.01); *B41J 11/0015* (2013.01); *H04N 1/54* (2013.01)

(58) Field of Classification Search
    CPC .... B41M 7/0027; B41J 2/2054; B41J 2/2114; B41J 11/0015; H04N 1/54
    See application file for complete search history.

(56) References Cited

U.S. PATENT DOCUMENTS

2016/0144630 A1     5/2016   Yamamoto et al.
2017/0057245 A1     3/2017   Morita et al.
2018/0126747 A1*    5/2018   Katsuno ................. B41J 2/2117
2019/0068832 A1     2/2019   Oya
2021/0237468 A1     8/2021   Takahashi et al.

FOREIGN PATENT DOCUMENTS

JP          2017-43004 A      3/2017
JP          2019-217760 A    12/2019
JP             6620561 B2    12/2019
WO     WO2011/064075 A2      6/2011

OTHER PUBLICATIONS

Extended European Search Report in counterpart application No. EP23154864.5, dated Jul. 11, 2023.

* cited by examiner

*Primary Examiner* — Henok D Legesse
(74) *Attorney, Agent, or Firm* — Greenblum & Bernstein, P.L.C.

(57)                ABSTRACT

A printing apparatus includes: a gloss forming unit that forms at least two regions having different gloss levels on a print medium; and a print image forming unit that forms a print image on the at least two regions having different gloss levels of the print medium after the gloss forming unit forms the at least two regions.

10 Claims, 14 Drawing Sheets

| L VALUE | GLOSS LEVEL |
|---------|-------------|
| 0 | GL000 |
| 1 | GL001 |
| ⋮ | ⋮ |
| 254 | GL254 |
| 255 | GL255 |

A

B

| GL90 | GL91 | ... | GL98 | GL99 |
|------|------|-----|------|------|
| GL80 | GL81 | ... | GL88 | GL89 |
| ... | ... | ... | ... | ... |
| GL10 | GL11 | ... | GL18 | GL19 |
| GL00 | GL01 | ... | GL08 | GL09 |

FIG.8

| R VALUE | G VALUE | B VALUE | GLOSS LEVEL |
|---------|---------|---------|-------------|
| 0 | 0 | 0 | GL000000000 |
| 0 | 0 | 1 | GL000000001 |
| : | : | : | : |
| 18 | 8 | 95 | GL018008095 |
| : | : | : | : |
| 187 | 110 | 141 | GL187110141 |
| : | : | : | : |
| 207 | 149 | 10 | GL207149010 |
| : | : | : | : |
| 255 | 255 | 254 | GL255255254 |
| 255 | 255 | 255 | GL255255255 | g1,g2,g3,
g4,g5,g6,
g7,g8,g9,
g10,g11,g12,
g13,g14,g15,
g16,g17,g18,
g19,g20,g21

UP
BACK RIGHT
LEFT FRONT
DOWN

1

PRINTING APPARATUS AND METHOD FOR FORMING PRINTED IMAGES HAVING GLOSSINESS

CROSS-REFERENCE TO RELATED APPLICATIONS

The present application claims priority under 35 U.S.C. § 119 to Japanese Patent Application No. 2022-022825, filed on Feb. 17, 2022 and Application No. 2022-189926, filed on Nov. 29, 2022. The above applications are hereby expressly incorporated by reference, in these entireties, into the present application.

BACKGROUND OF THE INVENTION

1. Field of the Invention

The present disclosure is related to a printing apparatus and method that forms printed images having glossiness on print media.

2. Description of the Related Art

Recently, printed images are being formed on print media constituted by various materials. It is now possible to express not only predetermined patterns, but any image that a user desires on various print media.

Imparting gloss onto printed images has been conventionally conducted. Generally, a method, in which a gloss solution represented by clear ink and the like is coated onto a print medium after a printed image is formed thereon, is employed.

For example, Japanese Unexamined Patent Publication No. 2019-217760 and Japanese Unexamined Patent Publication No. 2017-043004 propose that glossiness is imparted to print media on which printed images are formed by employing clear ink.

SUMMARY OF THE INVENTION

However, in Japanese Unexamined Patent Publication No. 2019-217760 and Japanese Unexamined Patent Publication No. 2017-043004, clear ink is coated uniformly onto each print medium. Therefore, although the degree of glossiness can be adjusted, the glossiness of the entire print medium is adjusted uniformly.

For example, there are cases in which an article includes a portion having glossiness such as glass or metal only at the portion, and cases in which it is desired to impart glossiness only to a portion of an article that is illuminated by light. In such cases, the glossiness of the article cannot be expressed realistically by the methods of Japanese Unexamined Patent Publication No. 2019-217760 and Japanese Unexamined Patent Publication No. 2017-043004, that imparts a uniform glossiness onto the entirety of print media.

The present disclosure provides a printing apparatus and method which is capable of enriching the expression of glossiness in a printed image and imparting a more realistic appearance thereto.

A printing apparatus of the present disclosure is equipped with: a gloss forming unit that forms at least two regions having different gloss levels on a print medium; and a print image forming unit that forms a printed image on the at least two regions of the print medium after the at least two regions having different gloss levels are formed by the gloss forming unit.

According to the printing apparatus of the present disclosure, at least two regions having different gloss levels are formed, and then a printed image is formed after these regions are formed. Therefore, the expression of glossiness of the printed image can be enriched, and a more realistic printed article having desired gloss levels can be obtained, without the hue of the printed article shifting.

BRIEF DESCRIPTION OF THE DRAWINGS

FIG. 5 is a diagram that illustrates an example of a table in which gloss levels are set corresponding to gradation values of luminosity.

FIG. 8 is a diagram that illustrates an example of a table in which gloss levels are set for all combinations of R values, G values, and B values.

DETAILED DESCRIPTION OF THE EMBODIMENTS

Figure 1:
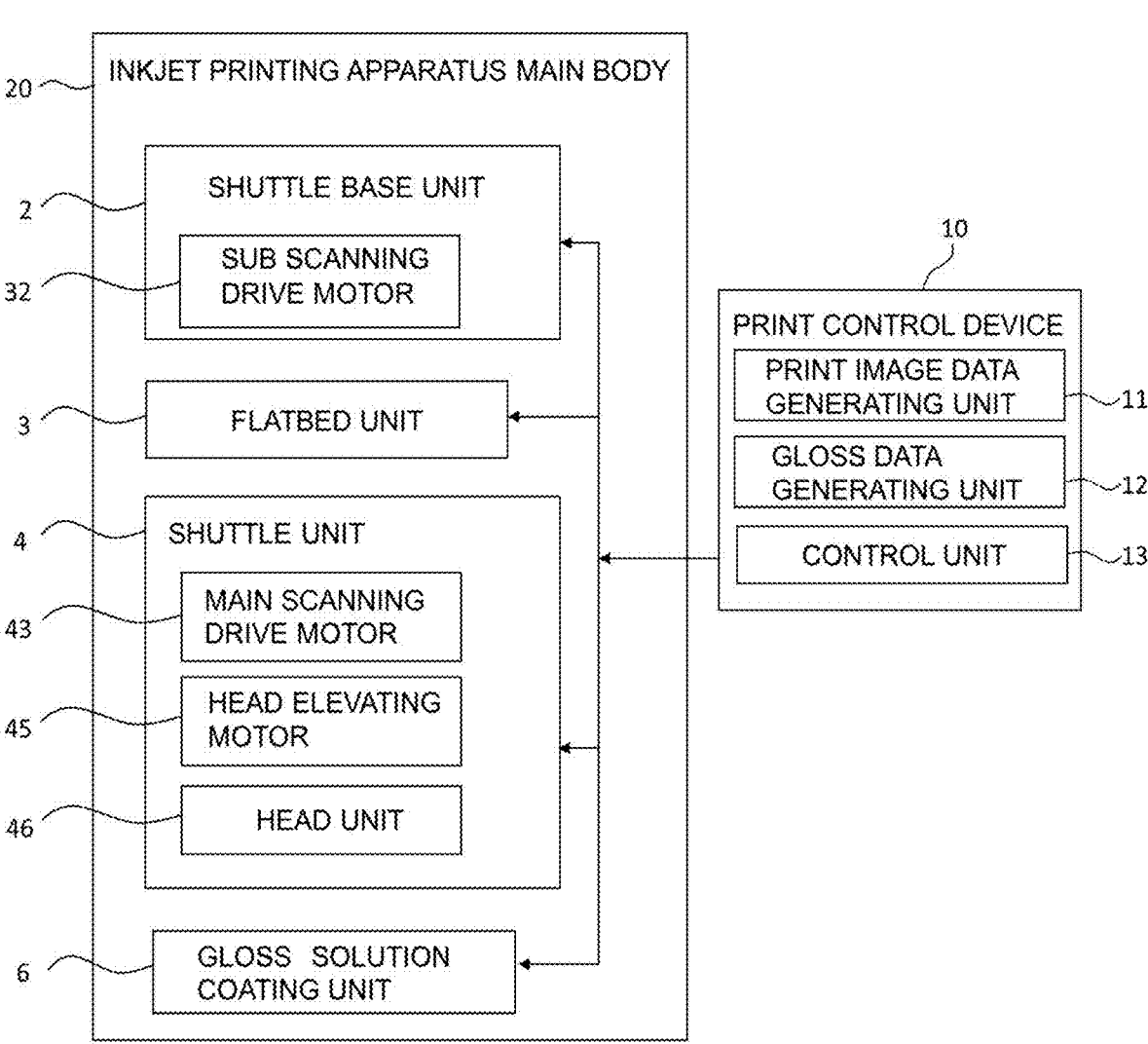
FIG. 1 is a block diagram that illustrates the schematic configuration of an inkjet printing apparatus that employs an embodiment of the printing apparatus of the present disclosure.

Hereinafter, an inkjet printing apparatus that employs an embodiment of a printing apparatus of the present disclosure will be described in detail with reference to the attached drawings. FIG. 1 is a block diagram that illustrates the schematic configuration of the inkjet printing apparatus 1.

The inkjet printing apparatus 1 of the present embodiment is equipped with a print control device 10 and an inkjet printing apparatus main body 20, as illustrated in FIG. 1.

The print control device 10 and the inkjet printing apparatus main body 20 are connected in a wired manner or wirelessly via a LAN (Local Area Network) or the like, and are configured to be capable of communicating with each other. Alternatively, the print control device 10 and the inkjet printing apparatus main body 20 may be connected via an Internet connection.

The print control device 10 outputs various command data related to a printing process to the inkjet printing apparatus main body 20. The print control device 10 is equipped with a print image data generating unit 11, a gloss level data generating unit 12, and a control unit 13, as illustrated in FIG. 1.

The print control device 10 is constituted by a computer equipped with a CPU (Central Processing Unit), a semiconductor memory, a hard disk, etc. The print control device 10 controls each component illustrated in FIG. 1 by executing a control program which is recorded in a recording medium such as the semiconductor memory and the hard disk, and by operating electrical circuits.

The print image data generating unit 11 generates print image data for forming a printed image, based on input image data which is a target of printing. Specifically, the print image data generating unit 11 generates C (cyan), M (magenta), Y (yellow), and K (black) print image data based on image data that represents an image to be printed.

The gloss level data generating unit 12 generates gloss level data based on image data that represents an image to be printed. The gloss level data is data for controlling the amount of a gloss solution to be coated by a gloss solution coating unit 6 to be described later. In the present embodiment, gloss level data that forms at least two regions having different gloss levels on a print medium is generated. The method for generating the gloss level data will be described in detail later.

The inkjet printing apparatus 1 of the present embodiment forms at least two regions having different gloss levels in a printed image. Therefore, the expression of glossiness in the printed image can be enriched, and a more realistic appearance can be imparted thereto.

In addition, the inkjet printing apparatus 1 of the present embodiment generates the gloss level data based on the image data that represents the image to be printed. Therefore, gloss corresponding to the contents of the image to be printed can be imparted.

The control unit 13 generates ink ejection control signals based on the C, M, Y, and K print image data, and outputs the generated ink ejection control signals to the inkjet printing apparatus main body 20. In addition, the control unit 13 generates gloss solution ejection control signals based on the gloss level data, and outputs the generated gloss solution ejection control signals to the inkjet printing apparatus main body 20.

The inkjet printing apparatus main body 20 ejects the gloss solution onto a print medium based on the gloss solution ejection control signals which are output from the control unit 13, and thereafter, ejects ink onto the print medium based on the ink ejection control signals to form a printed image. The configuration of the inkjet printing apparatus main body 20 will be described in detail later.

Next, the method by which gloss level data is generated by the gloss level data generating unit 12 will be described. First, a method in which gloss level data is generated based on the luminosity of image data that represents an image to be printed will be described.

Figure 2:
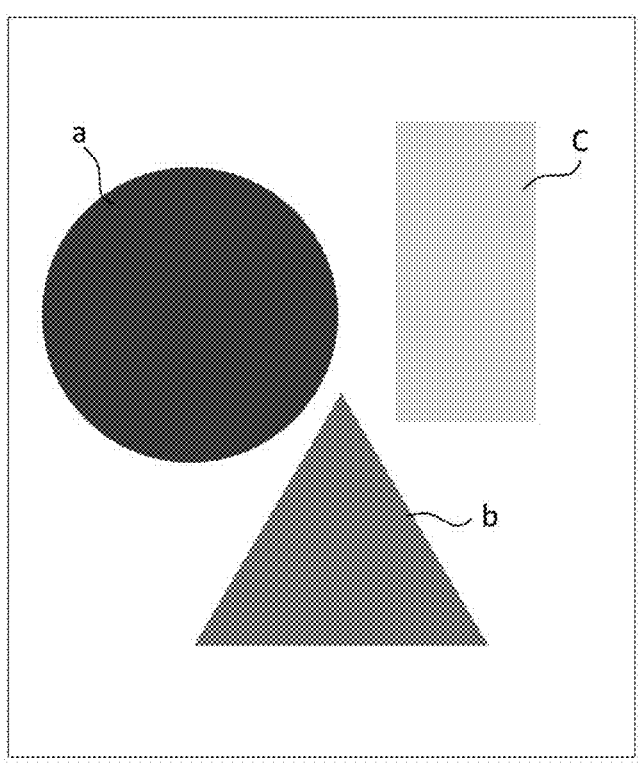
FIG. 2 is a diagram that illustrates an example of image data that represent a printed image.

In the case the image data that represents an image to be printed is monochrome data that has a region a, a region b, and a region c having different luminosities as illustrated in FIG. 2, image data for the region a, the region b, and the region c are employed to calculate the luminosity of each of the regions a through c. In the case that the image data is monochrome data, the luminosity value of each pixel is applied.

4

Figure 3:
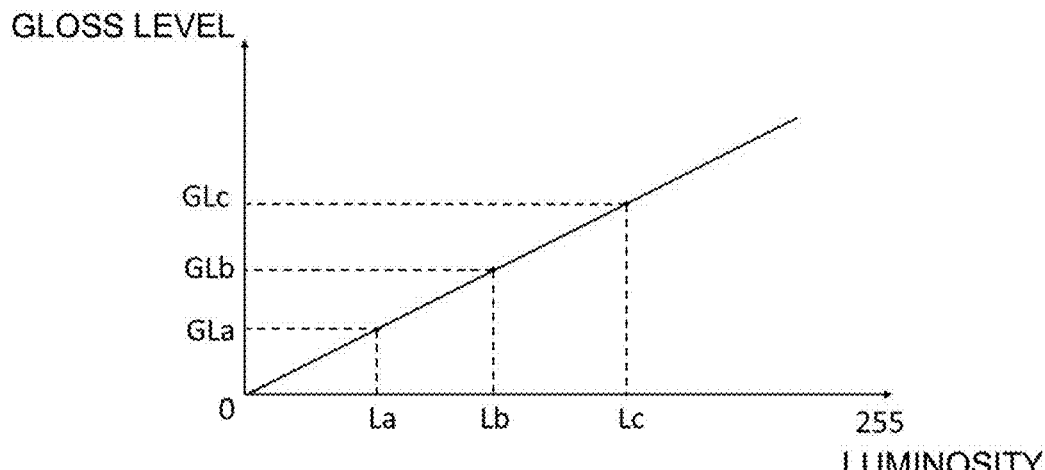
FIG. 3 is a diagram that illustrates an example of a function that represents the relationship between luminosity and gloss level.

A function that represents the relationship between luminosity and gloss level such as that illustrated in FIG. 3 is set in the gloss level data generating unit 12 in advance. The gloss level data generating unit 12 obtains gloss levels GLa, GLb, and GLc that correspond to a luminosity La of the region a, a luminosity Lb of the region b, and a luminosity Lc of the region c, based on the luminosities La, Lb, and Lc of each of the regions and the function illustrated in FIG. 3.

Then, the gloss level data generating unit 12 generates gloss level data that will cause an amount of the gloss solution corresponding to the gloss level GLa to be coated onto the region a, an amount of the gloss solution corresponding to the gloss level GLb to be coated onto the region b, and an amount of the gloss solution corresponding to the gloss level GLc to be coated onto the region c.

As described above, in the case that gloss level data is generated based on the luminosity of image data that represents an image to be printed, gloss can be imparted according to the luminosity of the image to be printed. In addition, by forming a printed image after the gloss solution is coated as will be described later, the influence exerted by turbidity of the gloss solution onto the printed image can be suppressed.

In the case that image data that represents an image to be printed is color data, luminosities La through Lc are calculated with respect to each of the regions a through c based on Formula (1) below.

$$L=(R\cdot kr)+(G\cdot kg)+(B\cdot kb) \tag{1}$$

In Formula (1), R is an R value, G is a G value, and B is a B value. The R value is a gradation value of red, the G value is a gradation value of green, and the B value is a gradation value of blue. In addition, kr, kg, and kb are coefficients which are set in advance.

The coefficients kr, kg, and kb maybe set to kr=0.3, Kg=0.6, and kb=0.1, for example. However, the coefficients kr, kg, and kb are not limited to these values, and it is preferable for the values of the coefficients kr, kg, and kb to be within the ranges of Formula (2) below.

$$0.15 \leq \text{coefficient } kr \leq 0.35$$

$$0.55 \leq \text{coefficient } kg \leq 0.75$$

$$0 \leq \text{coefficient } kb \leq 0.2 \tag{2}$$

Table 1 below is a table that shows the R value, the G value, the B value, and luminosities L corresponding to each of the regions a through c as text. Table 2 below is a table that shows specific R value, G value, and G value as well as the values of luminosity L which are calculated based on the R value, the G value, and the B value employing Formula (1) above. Note that each of the regions a through c are single colors.

TABLE 1

| Region | R Value | G Value | B Value | Luminosity (L) |
|--------|---------|---------|---------|----------------|
| a | Ra | Ga | Bb | La |
| b | Rb | Gb | Bb | Lb |
| c | Rc | Gc | Bc | Lc |

TABLE 2

| Region | R Value | G Value | B Value | Luminosity (L) |
|--------|---------|---------|---------|----------------|
| a | 255 | 0 | 255 | 102 |
| b | 0 | 255 | 255 | 179 |
| c | 255 | 255 | 0 | 230 |

The gloss level data generating unit 12 obtains gloss levels GLa, GLb, and GLc corresponding to the luminosities La, Lb, and Lc of each of the regions a through c, by inputting the luminosity La of the region a, the luminosity Lb of the region b, and the luminosity Lc of the region c into the function illustrated in FIG. 3, in the same manner as in the case for monochrome data.

Gloss that corresponds to the luminosity of an image to be printed can be imparted in the case that the image to be printed is a color image, by calculating luminosities based on Formula (1) above, and by generating gloss level data based on the luminosities.

In addition, more appropriate luminosities can be calculated in the case that the coefficients kr, kg, and kb in Formula (1) are set to be within the ranges of Formula (2) above.

In addition, the gloss solution is not completely colorless, but is colored. Therefore, the influence of the color of the gloss solution onto a printed image can be suppressed, by forming the printed image after the gloss solution is coated as will be described later.

Note that the function that represents the relationship between luminosity L and gloss level GL is not limited to the function illustrated in FIG. 3. The function illustrated in FIG. 3 is that which sets bright portions of an image to be printed to have high gloss and dark portions of the image to be printed to have low gloss. However, a function that inversely sets bright portions of an image to be printed to have low gloss and dark portions of the image to be printed to have high gloss such as that illustrated in FIG. 4A may be employed.

Figure 4:
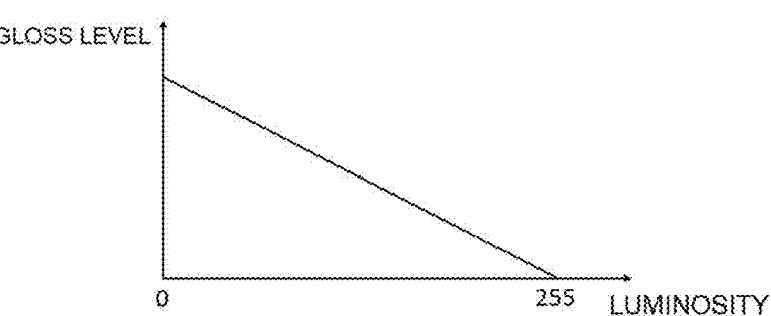
FIG. 4 is a collection of diagrams that illustrate other examples of a function that represents the relationship between luminosity and gloss level.
Figure 4:
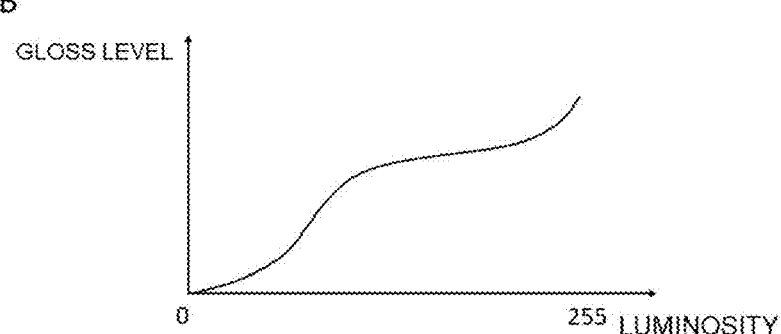
Figure 4:
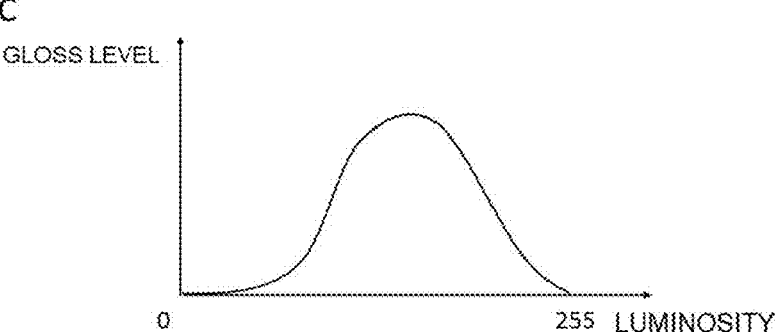
Figure 4:
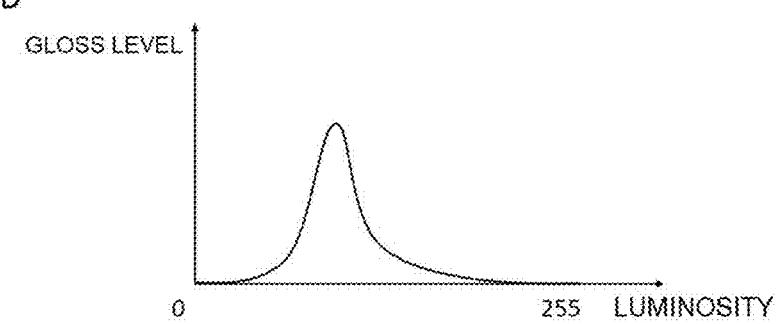

In addition, it is not necessary for the function to be a linear function such as those illustrated in FIG. 3 and FIG. 4A, and may be various functions such as the quadratic functions illustrated in FIG. 4B through FIG. 4D.

Further, a plurality of functions that represent the relationship between luminosity L and gloss level GL maybe set in advance. In this case, a user may select a desired function based on the contents of an image to be printed.

Still further, a table in which gloss levels GL000 through GL255 that correspond to gradation values of luminosity L from 0 to 255 are set as illustrated in FIG. 5 may be employed instead of setting the functions as described above.

Figure 6:
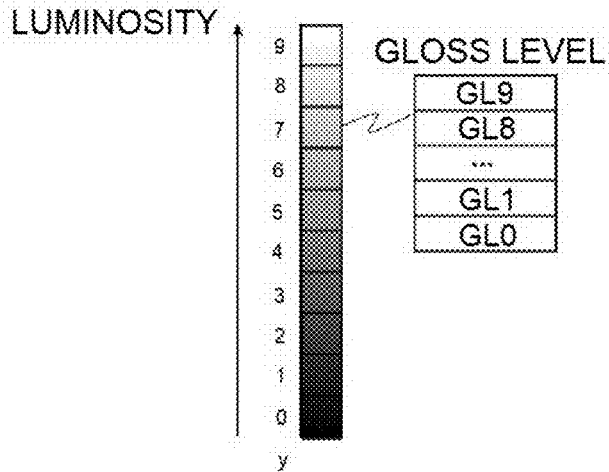
FIG. 6 is a diagram that illustrates an example of a table in which gloss levels are set corresponding to 10 levels of luminosity.

Still yet further, in the above description, gloss levels that correspond to gradation values of luminosity L from 0 through 255 are obtained. However, the printing apparatus of the present disclosure is not limited to such a configuration. Gradation values of luminosity L from 0 through 255 may be sectioned into 10 levels from 0 through 9, and 10 gloss levels GL0 through GL9 that correspond to each of the luminosity levels may be set, as illustrated in FIG. 6, for example. In this case, it may be specified which of the levels of luminosity the luminosities La, Lb, and Lc of each of regions a, b, and c belongs, and gloss levels corresponding to the specified level may be designated as gloss levels GLa, GLb, and GLc that correspond to the specified levels of luminosity.

Figure 7:
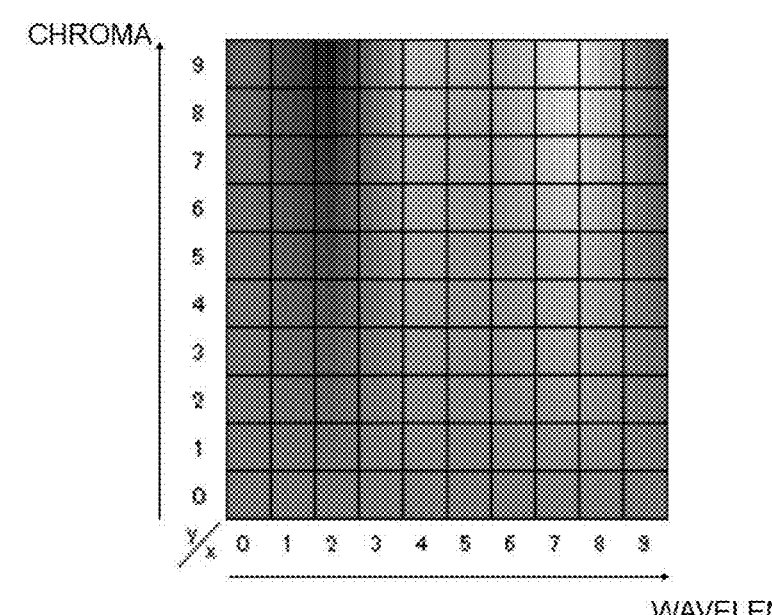
FIG. 7 is a collection of diagrams that illustrate an example of a table in which gloss levels are set for all colors.

In the case that the image data that represents an image to be printed is color data, the entire gamut of colors may be expressed with wavelengths and chroma as axes as illustrated in FIG. 7A, the graph may be sectioned into 10.10=100 cells, and gloss levels that correspond to each cell may be set in advance, as illustrated in FIG. 7B. By adopting such a configuration, a gloss level which is set for a cell region that includes the color of a pixel with respect to each pixel of image data that represents an image to be printed. Note that in FIG. 7A, the entire gamut of colors is expressed as a region having wavelength and chroma as axes. However, the entire gamut of colors may be expressed as a region having chromaticity values such as Lab as axes, or a region having chroma and luminosity as axes. In the case that gloss level data is generated based on the hue (wavelength and chroma) of image data in this manner, a desired gloss can be imparted to each color. In addition, the gloss solution is not completely colorless, but is colored. Therefore, the influence of the wavelength properties (hue) of the gloss solution onto a printed image can be suppressed, by forming the printed image after the gloss solution is coated as will be described later.

In addition, a screen such as that illustrated in FIG. 7A (x: wavelength, y: chroma) may be displayed, a user may select a color from among the cells for each color to which they wish to impart gloss to, and a gloss value may be obtained by referring to the table illustrated in FIG. 7B, to generate gloss level data.

Further, a table in which gloss levels GL000000000 through GL255255255 that corresponds to every combination of R values from 0 to 255, G values from 0 to 255, and B values from 0 to 255 are set may be set in advance, as illustrated in FIG. 8. In this case, the gloss level data generating unit 12 may obtain the gloss level for each of the regions a, b, and c, by referring to the table of FIG. 8 based on combinations of the R value, the G value, and the B value in each of the regions a through c, and specifying a gloss level that correspond to the combinations of the R value, the G value, and the B value in each of the regions a through c.

In the case that gloss level data is generated based on gradation values of image data as described above, gloss can be imparted in finer gradations, and the expression of gloss can be enriched. In addition, the gloss solution is not completely colorless, but is colored. Therefore, the influence of the colors that correspond to the gradation value of the gloss solution onto a printed image can be suppressed, by forming the printed image after the gloss solution is coated as will be described later.

In addition, an example in which the gloss level data generating unit 12 generates gloss level data based on image data that represents an image to be printed was described above. However, the method for generating gloss level data is not limited to such a case.

For example, input may be received from a user regarding settings for an incident angle θ and a desired gloss level for the incident angle θ with respect to each of the regions a through c, to generate gloss level data that determines the amount of the gloss solution to be coated on each of the regions a through c based on the incident angle θ and the desired gloss level. Note that the relationship among the incident angle θ, desired gloss levels, and the amounts of gloss solution to be coated may be set in advance as a function or in a table.

In the case that information regarding incident angles and information regarding gloss levels are received and gloss level data is generated based on the information regarding an incident angle and information regarding gloss levels as described above, gloss levels that a user desires can be imparted.

In addition, the gloss solution has a thickness, and therefore gloss fluctuations become likely to occur due to halation, etc. However, the influence of the thickness of the gloss solution onto a printed image can be suppressed, by forming the printed image after the gloss solution is coated as will be described later.

Note that in the case that gloss levels are obtained by employing functions and tables as described above, the incident angle is set to 60 degrees in advance. However, the present disclosure is not limited to this angle, and functions or tables may be set for each of a plurality of incident angles. Thereby, more desired gloss levels can be obtained.

In addition, in the above description, a different gloss level is set for each of the region a, which is a circular image, the region b, which is a triangular image, and the region c, which is a rectangular image. However, there are various methods for setting regions having different gloss levels.

Figure 9:
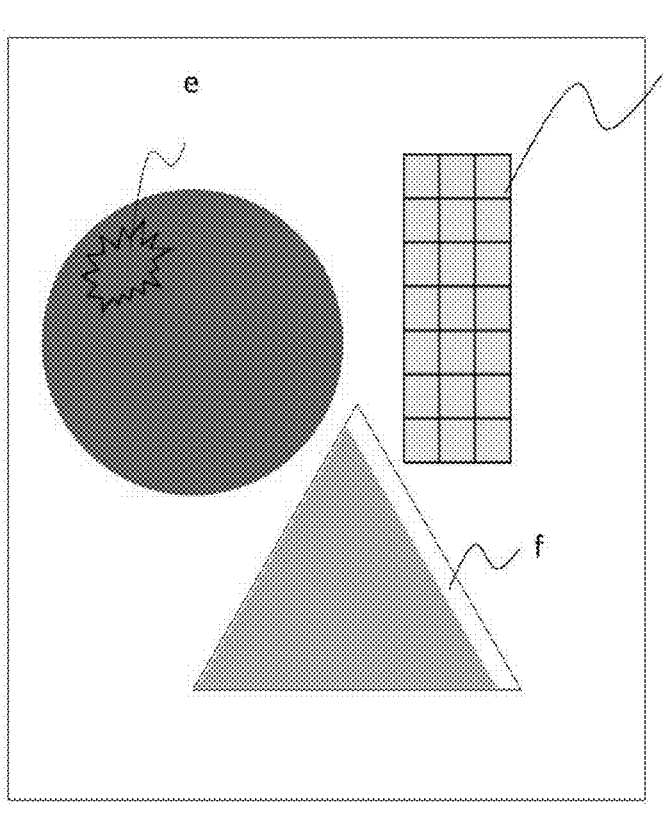
FIG. 9 is a diagram that illustrates an example of a method for setting regions having different gloss levels.

A gloss level may be set only for a region e within the circular image, a gloss level may be set only for a region f within the triangular image, and the gloss solution may be coated in these regions as illustrated in FIG. 9, for example. That is, different gloss levels may be set for a region within a single cohesive image (such as an image of an apple and an image of a clock) and other regions within the image, and the gloss solution may be coated according to the set gloss levels. In addition, a single cohesive image may be sectioned into a plurality of segments g1 through g21 as in the region of the rectangular image illustrated in FIG. 9, different gloss levels may be set for each of the segments, and the gloss solution may be coated according to the set gloss levels. Further, two regions having different gloss levels may be set, by providing a region at which a gloss level is set and providing a region at which a gloss level is not set or set to 0 on a single sheet of print media.

Figure 10:
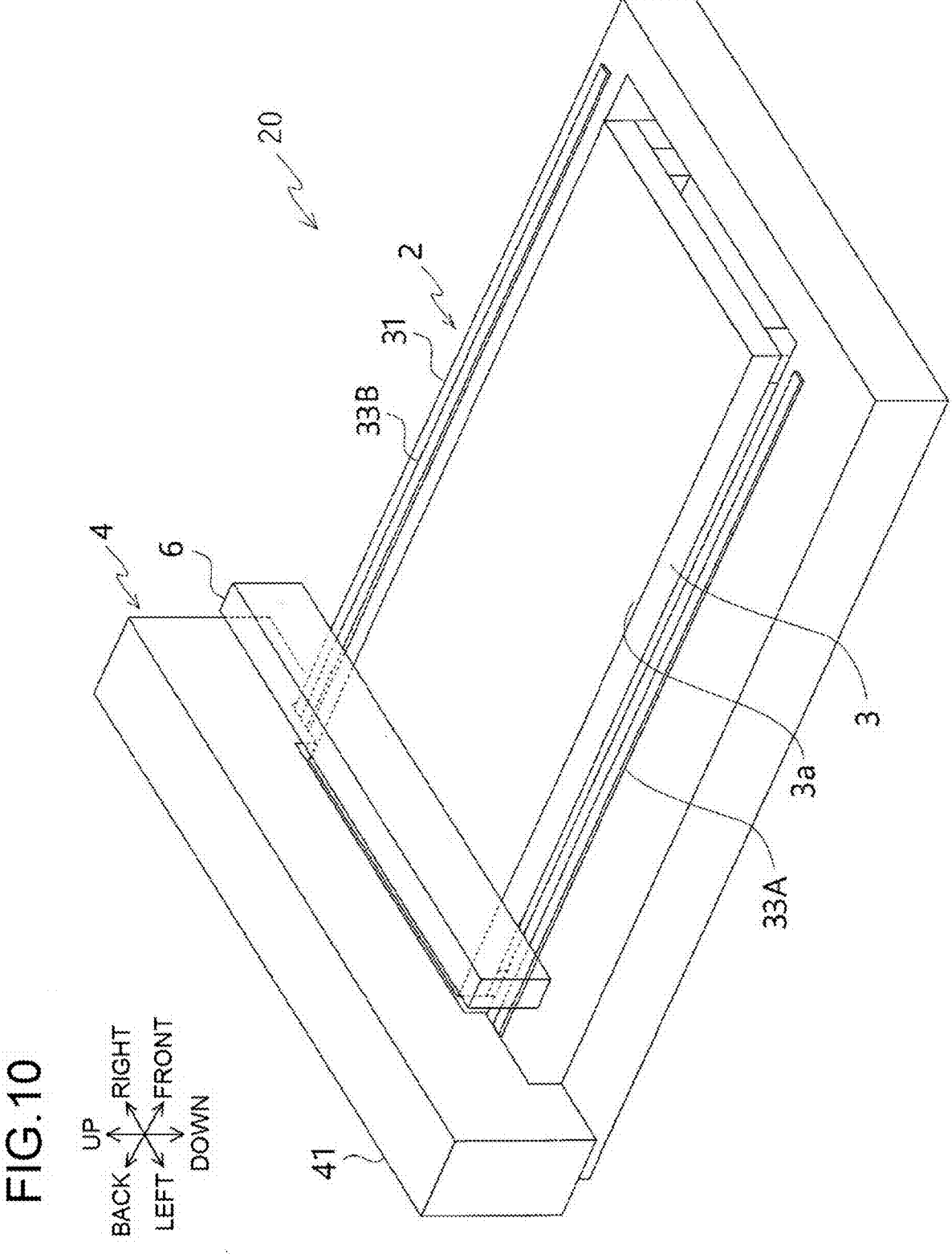
FIG. 10 is a perspective view that illustrates the schematic configuration of the main body of the inkjet printing apparatus.

Next, the inkjet printing apparatus main body 20 illustrated in FIG. 1 will be described. FIG. 10 is a perspective view that illustrates the schematic configuration of the inkjet printing apparatus main body 20. In the description of the embodiment below, the up, down, left, right, front, and back indicated by arrows in FIG. 10 are designated as the up, down, left, right, front, and back directions of the inkjet printing apparatus main body 20.

As illustrated in FIG. 10, the inkjet printing apparatus main body 20 is equipped with a shuttle base unit 2, a flatbed unit 3, a shuttle unit 4, and a gloss solution coating unit 6. Note that in the present embodiment, the shuttle unit 4, the print image data generating unit 11, and the control unit 13 correspond to the print image forming unit of the present disclosure, and the gloss solution coating unit 6, the gloss level data generating unit 12, and the control unit 13 correspond to the gloss forming unit of the present disclosure.

The shuttle base unit 2 supports the shuttle unit 4 and the gloss solution coating unit 6. The shuttle base unit 2 moves the shuttle unit 4 and the gloss solution coating unit 6 in the front-back direction (sub scanning direction). Specifically, the shuttle base unit 2 is equipped with a gantry unit 31, sub scanning drive guides 33A and 33B, and a sub scanning drive motor 32 (refer to FIG. 1).

The gantry unit 31 is formed in the shape of a rectangular frame, and supports the shuttle unit 4 and the gloss solution coating unit 6. The sub scanning drive guides 33A and 33B that extend in the front-back direction are respectively formed above the left and right sides of the frame of the gantry unit 31. The sub scanning drive guides 33A and 33B guide the shuttle unit 4 and the gloss solution coating unit 6 so as to move in the front-back direction. The sub scanning drive motor 32 moves the shuttle unit 4 and the gloss solution coating unit 6 in the front-back direction.

The flatbed unit 3 supports a print medium M. The flatbed unit 3 is arranged in a rectangular parallelepiped shaped recess formed inside the gantry unit 31 of the shuttle base unit 2. The flatbed unit 3 has a medium mounting surface 3a, which is a horizontal surface on which a print medium M is placed. The flatbed unit 3 has an elevating mechanism that includes a hydraulic drive mechanism (not shown) or the like such that the height of the medium mounting surface 3a can be adjusted.

Figure 11:
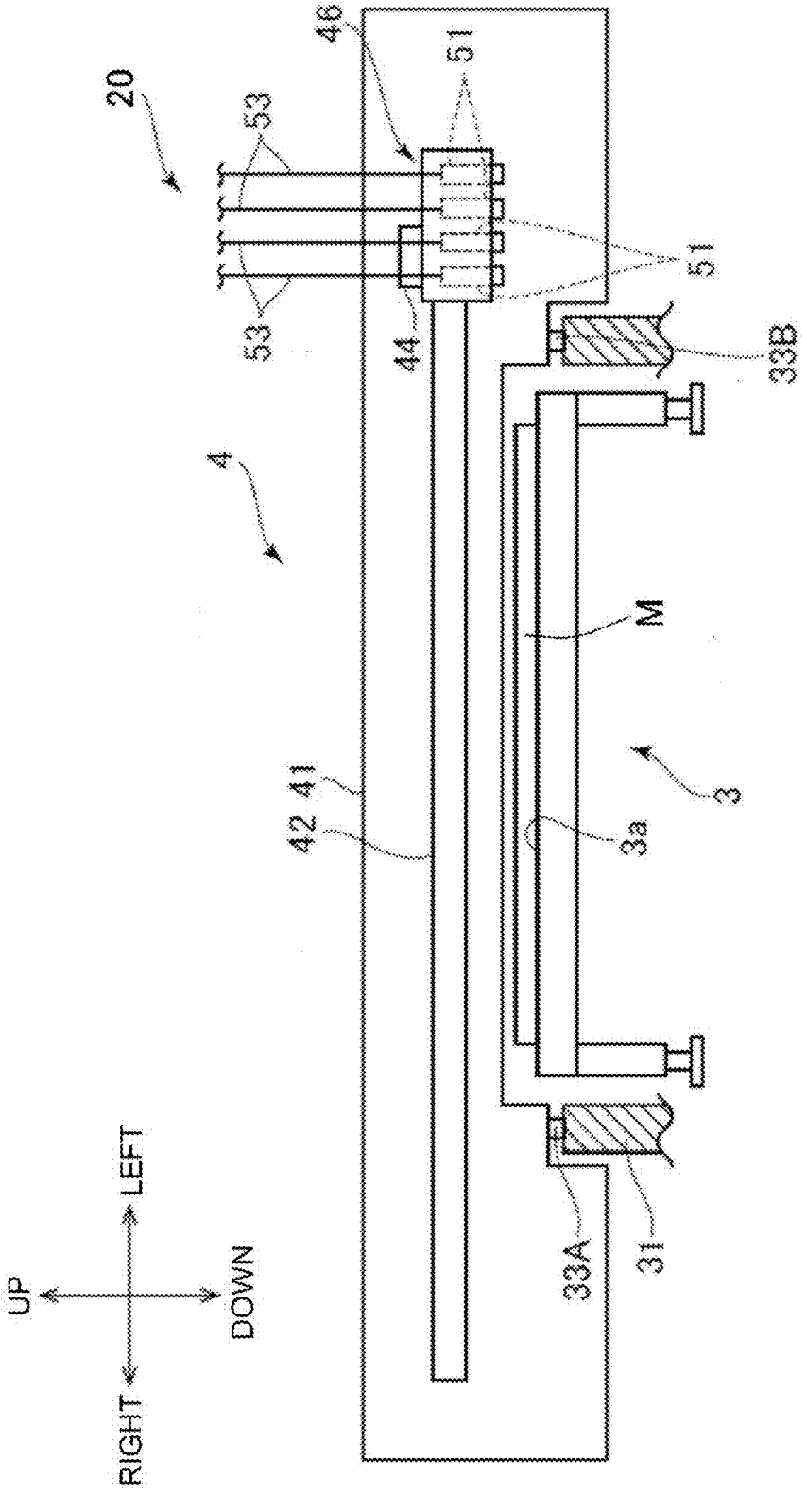
FIG. 11 is a diagram that illustrates the interior configuration of a shuttle unit.

The shuttle unit 4 administers a print image forming process on the print medium M. FIG. 11 is a diagram that illustrates the schematic configuration of the shuttle unit 4.

FIG. 11 is a diagram that illustrates the schematic configuration of the shuttle unit 4. As illustrated in FIG. 11, the shuttle unit 4 is equipped with a casing 41, a main scanning drive guide 42, a main scanning drive motor 43 (refer to FIG. 1), a head elevating guide 44, a head elevating motor 45 (refer to FIG. 1), and a head unit 46.

The casing 41 accommodates components such as the head unit 46. The casing 41 is formed in a portal shape so as to straddle the flatbed unit 3 in the left-right direction. The casing 41 is supported by the gantry unit 31 of the shuttle base unit 2 and is configured to be movable along the sub scanning drive guides 33A and 33B.

The main scanning drive guide 42 guides the head unit 46 so as to move in the left-right direction (main scanning direction). The main scanning drive guide 42 is formed by an elongated member that extends in the left-right direction. The head unit 46 is moved in the left-right direction by the main scanning drive motor 43.

The head elevating guide 44 guides the head unit 46 to move in the up-down direction. The head elevating guide 44 is formed by a member having a shape which is elongated in the up-down direction. The head elevating guide 44 is configured to be movable in the left-right direction along the main scanning drive guide 42 together with the head unit 46. The head unit 46 is moved up and down in the up-down direction by the head elevating motor 45.

The head unit 46 administers the print image forming process by ejecting ink onto the print medium M while moving in the left-right direction along the main scanning drive guide 42 in the manner described above. As illustrated in FIG. 11, the head unit 46 has four inkjet heads 51.

The four inkjet heads 51 are arranged in parallel in the left-right direction. The four ink jet heads 51 respectively eject C, M, Y, and K ink. An ink supply tube 53 that supplies ink is respectively connected to each of the four inkjet heads 51.

Returning to FIG. 10, the gloss solution coating unit 6 performs a gloss solution coating process by coating the gloss solution onto the print medium M. Note that a known gloss solution may be employed.

The gloss solution coating unit 6 is supported by the gantry unit 31 of the shuttle base unit 2, and is configured to be movable along the sub scanning drive guides 33A and 33B. The gloss solution coating unit 6 coats the gloss solution onto predetermined ranges on the print medium M under the gloss solution coating unit 6 while moving in the sub scanning direction.

The gloss solution coating unit 6 is of a configuration similar to that of the shuttle unit 4, and performs the gloss solution coating process by ejecting the gloss solution from inkjet heads while moving the inkjet heads in the left-right direction (main scanning direction).

The inkjet printing apparatus main body 20 operates each of the components illustrated in FIG. 1 which are targets of control in response to control signals from the print control device 10.

Next, the operation of the inkjet printing apparatus 1 of the present embodiment will be described with reference to FIG. 12A through FIG. 12D. Note that FIG. 12A through FIG. 12D are diagrams of the inkjet printing apparatus main body 20 as viewed from the left side.

Figure 12:
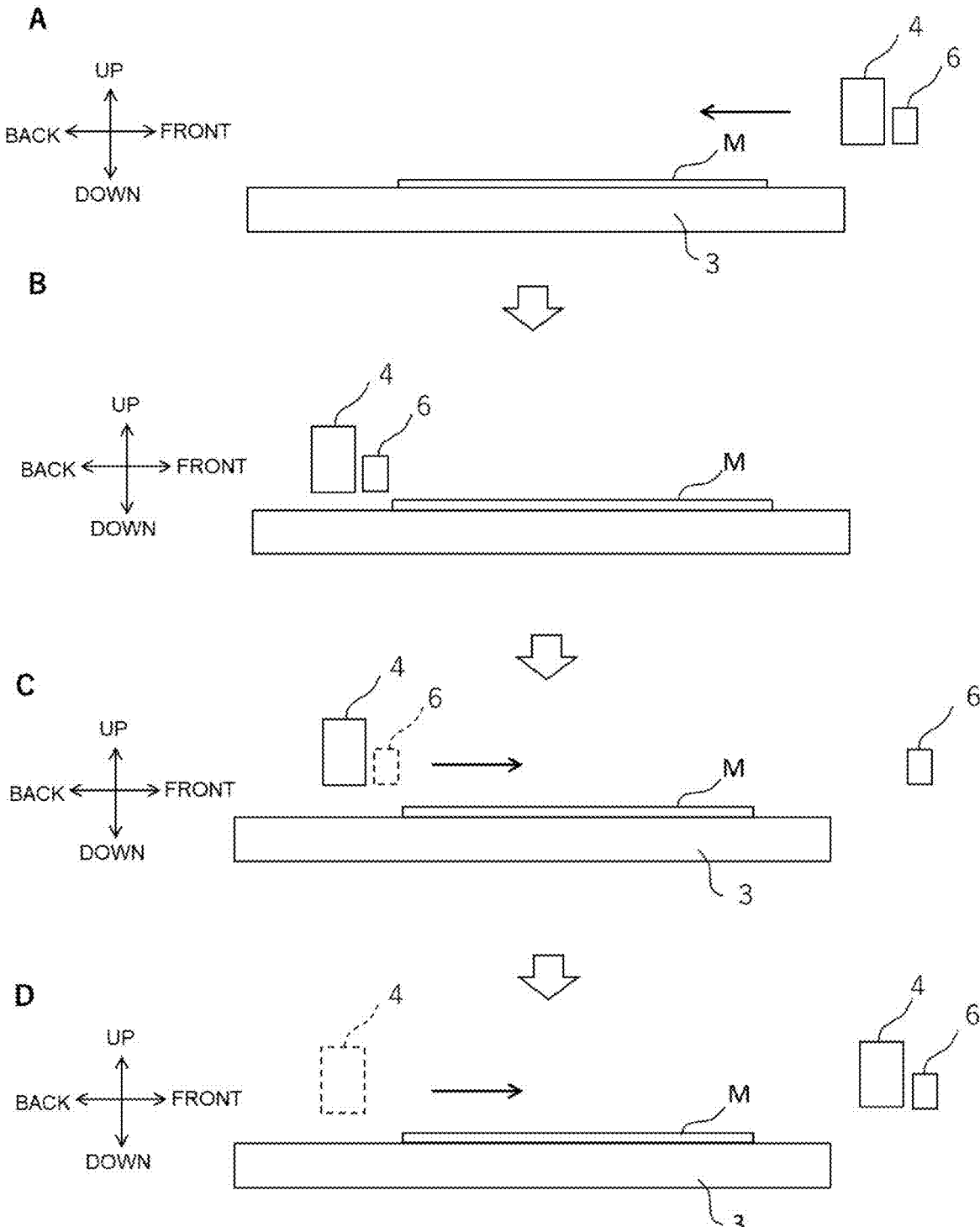
FIG. 12 is a collection of diagrams for explaining the operation of the inkjet printing apparatus illustrated in FIG. 10.

First, as illustrated in FIG. 12A, a print medium M is placed on the flatbed unit 3. At this time, the shuttle unit 4 and the gloss solution coating unit 6 are disposed at an initial position at the frontmost end, as illustrated in FIG. 12A. Then, the print control device 10 drives the sub scanning drive motor 32. Thereby, the shuttle unit 4 and the gloss solution coating unit 6 initiate movement toward the back direction (the direction indicated by the arrow in FIG. 12A) from the initial position illustrated in FIG. 12A to the print initiating position illustrated in FIG. 12B.

Next, as illustrated in FIG. 12C, the print control device 10 moves the gloss solution coating unit 6 in the forward direction (the direction indicated by the arrow in 12C) and operates the inkjet heads within the gloss solution coating unit 6 to coat the print medium M with the gloss solution, to perform the gloss solution coating process.

Specifically, the print control device 10 first controls the main scanning drive motor 43 in a state in which the gloss solution coating unit 6 is at the print initiating position, to move the inkjet heads that eject the gloss solution in the main scanning direction. Then, a gloss solution coating process for one pass is performed by the inkjet heads ejecting the gloss solution in response to gloss solution ejection control signals which are based on gloss level data.

After coating of the gloss solution for one pass is completed, the print control device 10 controls the sub scanning drive motor 32 to move the gloss solution coating unit 6 forward to the printing position for a next pass. The print control device 10 causes the gloss solution coating unit 6 to coat predetermined regions within the print medium M by alternately repeating the gloss solution coating process and movement of the gloss solution coating unit 6.

Then, after the gloss solution is coated onto the print medium M by the gloss solution coating unit 6, the print medium M is conveyed to a drying device (not shown) and a drying process is conducted. After the drying process by the drying device is completed, the print medium M is placed within the inkjet printing apparatus main body 20 again, and the print control device 10 controls the sub scanning drive motor 32 to perform a printing process while moving the shuttle unit 4 in the forward direction (the direction indicated by the arrow illustrated in FIG. 12D), as illustrated in FIG. 12D.

Specifically, the print control device 10 first controls the main scanning drive motor 43 in a state in which the shuttle unit 4 is at the print initiating position, to move the head unit 46 in the main scanning direction. Then, a printing process for one pass is performed by the inkjet heads 51 of the head unit 46 ejecting ink in response to ink ejection control signals which are based on image data of an image to be printed.

After printing for one pass is completed, the print control device 10 controls the sub scanning drive motor 32 to move the shuttle unit 4 forward to the printing position for a next pass. The print control device 10 causes the shuttle unit to form a printed image on the print medium M by alternately repeating the printing process and movement of the shuttle unit 4.

Then, at a point in time at which a printing process is completed for one sheet of print media, the shuttle unit 4 and the gloss solution coating unit 6 will be in a state in which they are disposed at the initial position again, as illustrated in FIG. 12D.

By forming at least two regions having different gloss levels in single individual scans as described above, a printing article having desired gloss levels can be obtained with a short processing time.

In addition, the printed image is formed by the shuttle unit 4 after the gloss solution coating unit 6 coats the gloss solution onto the print medium M in the present embodiment, as described above. If a gloss solution such as clear ink is coated after a printed image is formed in the conventional manner, the transparency and color turbidity of the gloss solution will be added to the colors of the printed image, and there is a concern that an ultimately printed article will be that in which hues are shifted from desired hues.

However, by forming a printed image after a gloss solution is coated as in the present embodiment, a printed article having desired gloss levels can be obtained without the hues of the printed articles shifting.

Note that in the inkjet printing apparatus 1 of the above embodiment, the drying device was provided as a separate configuration. However, a drying unit may be provided in the inkjet printing apparatus main body 20 in the same manner as the gloss solution coating unit 6, and the drying process may be performed by scanning a print medium M with the drying unit.

In addition, the gloss solution coating unit 6 is provided in the inkjet printing apparatus main body 20 in the present embodiment. However, the printing apparatus of the present disclosure is not limited to such a configuration. An inkjet printing apparatus equipped with a shuttle unit 4 and a gloss solution coating apparatus equipped with a gloss solution coating unit 6 may be provided separately, for example. A print medium M to which a gloss solution coating process has been administered by the gloss solution coating apparatus may be moved to the inkjet printing apparatus, and a printing process may be administered to the print medium M, to which the gloss solution coating process has been administered.

Further, in the description of the above embodiment, regions which are targets of coating by the gloss solution are coated by the gloss solution in a single scan (one coating step) of the inkjet heads of the gloss solution coating unit 6. However, the printing apparatus of the present disclosure is not limited to such a configuration, and the gloss solution may be coated by a plurality of scans.

In the case that the gloss solution is coated by a plurality of scans in this manner, a region having a predetermined gloss level may be formed by the gloss solution coating unit 6 forming a maximum number of dots which is set in advance for a predetermined unit area without the dots overlapping, and then forming new dots on dots which are already formed within the unit area. Hereinafter, a method for forming a region having a predetermined gloss level will be described with reference to FIG. 13A through FIG. 13H.

FIG. 13A through FIG. 13H illustrate an example in which dots of the gloss solution are formed a region constituted by four squares (unit area) such that the region will have a predetermined gloss level. The maximum number of dots to be formed in each of the squares is four. The white circles represent dots which are formed by a first ejection, and the black circles represent dots which are formed by a second ejection onto the same position. Dots are formed in order from FIG. 13A to FIG. 13H according to a predetermined gradation of gloss level. That is, FIG. 13A through FIG. 13H illustrate a method of arranging dots for a case in which eight gradations of gloss levels are obtained.

Figure 13:
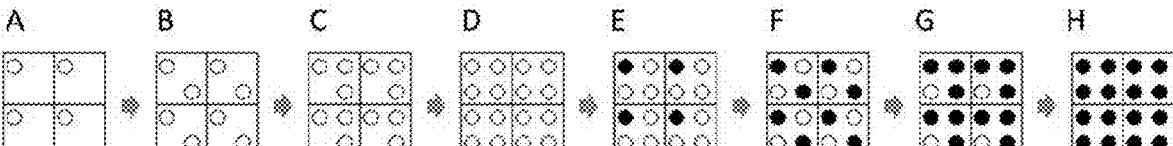
FIG. 13 is a collection of diagrams that illustrate an example of a method for arranging dots of a gloss solution.

First, in the case that a one gradation gloss level is to be obtained, a first dot is formed in each of the squares as illustrated in FIG. 13A. Next, in the case that a two gradation gloss level is to be obtained, a second dot is formed in each of the squares as illustrated in FIG. 13B. In the case that a three gradation gloss level is to be obtained, a third dot is formed in each of the squares as illustrated in FIG. 13C, and in the case that a four gradation gloss level is to be obtained, a fourth dot is formed in each of the squares as illustrated in FIG. 13D. As illustrated in FIG. 13A through FIG. 13D, the dots are formed such that they do not overlap up to a four gradation gloss level, that is, until four dots, which is the maximum number of dots in a single square, are formed.

Next, after each of the squares is filled with the maximum number (four) of dots, new dots are formed to overlap the existing dots by an arrangement method similar to the arrangement method illustrated in FIG. 13A through FIG. 13D, as illustrated in FIG. 13E through FIG. 13H.

Specifically, a five gradation gloss level is obtained by forming fifth dots in each of the squares that overlap the dots which were formed in FIG. 13A, as illustrated in FIG. 13E. Next, a six gradation gloss level is obtained by forming sixth dots in each of the squares that overlap the dots which were formed in FIG. 13B, as illustrated in FIG. 13E A seven gradation gloss level is obtained by forming seventh dots in each of the squares that overlap the dots which were formed in FIG. 13C, as illustrated in FIG. 13G. Finally, an eight gradation gloss level is obtained by forming eighth dots in each of the squares that overlap the dots which were formed in FIG. 13D, as illustrated in FIG. 13H.

Note that when forming the dots of the gloss solution as described above, the number of gradations of gloss level may be increased by controlling the amount of the gloss solution to be ejected to form single dots. The so called multidrop method that ejects a plurality of drops of the gloss solution to form one dot, for example, may be employed as a method for controlling the amount of the gloss solution.

Note that a method that obtains eight gradations of gloss level as in the above method, but differs in the arrangements of dots will be described with reference to FIG. 14A through FIG. 14H.

Figure 14:
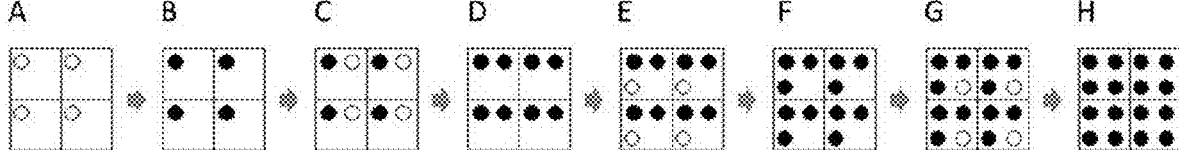
FIG. 14 is a collection of diagrams that illustrates another example of a method for arranging dots of a gloss solution.

First, in the case that a one gradation gloss level is to be obtained, first dots are formed in each of the squares, as illustrated in FIG. 14A. Next, in the case that a two gradation gloss level is to be obtained, second dots are formed to overlap the first dots which are already formed in FIG. 14A, as illustrated in FIG. 14B.

Continuing, in the case that a three gradation gloss level is to be obtained, third dots are formed in each of the squares, as illustrated in FIG. 14C. In the case that a four gradation gloss level is to be obtained, fourth dots are formed to overlap the third dots which are already formed in FIG. 14C, as illustrated in FIG. 14D.

Next, in the case that a five gradation gloss level is to be obtained, fifth dots are formed in each of the squares, as illustrated in FIG. 14E. In the case that a six gradation gloss level is to be obtained, sixth dots are formed to overlap the fifth dots which are already formed in FIG. 14E, as illustrated in FIG. 14F.

In the case that a seven gradation gloss level is to be obtained, seventh dots are formed in each of the squares, as illustrated in FIG. 14G. In the case that an eight gradation gloss level is to be obtained, eighth dots are formed to overlap the seventh dots which are already formed in FIG. 14G, as illustrated in FIG. 14H.

In the case that dots of the gloss solution are arranged as illustrated in FIG. 14A through FIG. 14G, that is, in the case that dots are formed to overlap existing dots before each of the squares are filled with the maximum number of dots, portions of a base material at which dots of the gloss solution are not arrange will be exposed. Therefore, the expression of glossiness will be inhibited, and it becomes difficult to obtain a desired gloss level.

In contrast, in the case that dots of the gloss solution are arranged as illustrated in FIG. 13A through FIG. 13G, the dots are arranged to decrease exposure of the base material as much as possible. Therefore, the gradations of gloss levels can be smoothed, and a desired gloss level can be obtained.

The additional items below will be disclosed in relation with the printing apparatus of the present disclosure.
(Additional Item 1)

The printing apparatus of the present disclosure is equipped with: a gloss forming unit that forms at least two regions having different gloss levels on a print medium; and a print image forming unit that forms a print image on the at least two regions of the print medium after the at least two regions having different gloss levels are formed by the gloss forming unit.
(Additional Item 2)

In the printing apparatus of Additional Item 1, the gloss forming unit may generate gloss level data based on image data of the print image, and employ the gloss level data to form at least two regions having different gloss levels.
(Additional Item 3)

In the printing apparatus of Additional Item 2, the gloss forming unit may generate the gloss level data based on the luminosity of the image data.
(Additional Item 4)

In the printing apparatus of Additional Item 3, the gloss forming unit may calculate the luminosity of each pixel that constitutes the image data based on red gradation values, green gradation values, and blue gradation values of each pixel and the formula below:

$$\text{Luminosity} = (\text{coefficient } kr \cdot \text{red gradation value}) + (\text{coefficient } kg \cdot \text{green gradation value}) + (\text{coefficient } kb \cdot \text{blue gradation value}).$$

(Additional Item 5)

In the printing apparatus of Additional Item 4, the coefficient kr, the coefficient kg, and the coefficient kb may be within ranges that satisfy the inequalities below:

$$0.15 \leq \text{coefficient } kr \leq 0.35$$

$$0.55 \leq \text{coefficient } kg \leq 0.75$$

$$0 \leq \text{coefficient } kb \leq 0.2.$$

(Additional Item 6)

In the printing apparatus of Additional Item 2, the gloss forming unit may generate the gloss level data based on a hue of the image data.
(Additional Item 7)

In the printing apparatus of Additional Item 2, the gloss forming unit may generate the gloss level data based on a gradation value of the image data.

(Additional Item 8)

In the printing apparatus of Additional Item 2, the gloss forming unit may receive information regarding an incident angle and information regarding a gloss level, and generate the gloss level data based on the information regarding an incident angle and the information regarding a gloss level.

(Additional Item 9)

In the printing apparatus of any one of Additional Item 1 through Additional Item 8, the gloss forming unit may form the at least two regions having different gloss levels by a single coating step.

(Additional Item 10)

In the printing apparatus of any one of Additional Item 1 through Additional Item 9, the gloss forming unit may perform coating by forming dots of a gloss solution within a predetermined unit area, and after a maximum number of dots for the unit area, which is set in advance, are formed without overlapping, new dots may be formed to overlap existing dots within the unit area.

(Additional Item 11)

A printing method of the present disclosure forms a print image on at least two regions of a print medium having different gloss levels after the at least two regions are formed on the print medium.

(Additional Item 12)

In the printing method of Additional Item 11, gloss level data may be generated based on image data of the print image, and the at least two regions having different gloss levels may be formed by employing the gloss level data.

(Additional Item 13)

In the printing method of Additional Item 12, the gloss level data may be generated based in the luminosity of the image data.

(Additional Item 14)

In the printing method of Additional Item 13, the luminosity of each pixel that constitutes the image data may be calculated based on red gradation values, green gradation values, and blue gradation values of each pixel and the formula below:

$$\text{Luminosity} = (\text{coefficient } kr \cdot \text{red gradation value}) + (\text{coefficient } kg \cdot \text{green gradation value}) + (\text{coefficient } kb \cdot \text{blue gradation value}).$$

(Additional Item 15)

In the printing method of Additional Item 14, the coefficient kr, the coefficient kg, and the coefficient kb may be within ranges that satisfy the inequalities below:

$$0.15 \leq \text{coefficient } kr \leq 0.35$$

$$0.55 \leq \text{coefficient } kg \leq 0.75$$

$$0 \leq \text{coefficient } kb \leq 0.2.$$

(Additional Item 16)

In the printing method of Additional Item 12, the gloss level data may be generated based on a hue of the image data.

(Additional Item 17)

In the printing method of Additional Item 12, the gloss level data may be generated based on a gradation value of the image data.

(Additional Item 18)

In the printing method of Additional Item 12, information regarding an incident angle and information regarding a gloss level may be received, and the gloss level data may be generated based on the information regarding an incident angle and the information regarding a gloss level.

(Additional Item 19)

In the printing method of any one of Additional Item 11 through Additional Item 18, the at least two regions having different gloss levels may be formed by a single coating step.

(Additional Item 20)

In the printing method of any one of Additional Item 11 through Additional Item 19, coating may be performed by forming dots of a gloss solution within a predetermined unit area, and after a maximum number of dots for the unit area, which is set in advance, are formed without overlapping, new dots may be formed to overlap existing dots within the unit area.

What is claimed is:

1. A printing apparatus, comprising:

a gloss forming unit having inkjet heads that eject a gloss solution that forms at least two regions having different gloss levels on a print medium; and a print image forming unit that forms a print image on the at least two regions having different gloss levels of the print medium after the gloss forming unit forms the at least two regions, wherein the gloss forming unit generates gloss level data based on a luminosity of image data that represents the print image, and employs the gloss level data to form the at least two regions having different gloss levels, and the gloss forming unit calculates the luminosity of each pixel that constitutes the image data based on red gradation values, green gradation values, and blue gradation values of each pixel and the formula below:

$$\text{Luminosity} = (\text{coefficient } kr \cdot \text{red gradation value}) + (\text{coefficient } kg \cdot \text{green gradation value}) + (\text{coefficient } kb \cdot \text{blue gradation value}.$$

2. The printing apparatus as defined in claim 1, wherein:

the gloss forming unit generates the gloss level data based on a hue of the image data.

3. The printing apparatus as defined in claim 1, wherein:

the gloss forming unit generates the gloss level data based on a gradation value of the image data.

4. The printing apparatus as defined in claim 1, wherein:

the gloss forming unit forms the at least two regions having different gloss levels by a single coating step.

5. The inkjet printing apparatus as defined in claim 1, wherein:

the coefficient kr, the coefficient kg, and the coefficient kb are within ranges that satisfy the inequalities below:

$$0.15 \leq \text{coefficient } kr \leq 0.35$$

$$0.55 \leq \text{coefficient } kg \leq 0.75$$

$$0 \leq \text{coefficient } kb \leq 0.2.$$

6. A printing method, comprising:

forming at least two regions having different gloss levels by ejecting a gloss solution; and forming a print image on the at least two regions after the at least two regions are formed, wherein the method further comprises:

generating gloss level data based on a luminosity of image data that represents the print image, and forming the at least two regions having two different gloss levels by employing the gloss level data, calculating the luminosity of each pixel that constitutes the image data based on red gradation values, green gradation values, and blue gradation values of each pixel and the formula below:

$$\text{Luminosity} = (\text{coefficient } kr \cdot \text{red gradation value}) + (\text{coefficient } kg \cdot \text{green gradation value}) + (\text{coefficient } kb \cdot \text{blue gradation value}).$$

7. The printing method as defined in claim 6, wherein:

the gloss level data is generated based on a hue of the image data or a gradation value of the image data.

8. The printing method as defined in claim 6, wherein:

the at least two regions having different gloss levels are formed by a single coating step.

9. The printing method as defined in claim 6, wherein:

coating is performed by forming dots of a gloss solution within a predetermined unit area, and after a maximum number of dots for the unit area, which is set in advance, are formed without overlapping, new dots are formed to overlap existing dots within the unit area.

10. The inkjet printing method as defined in claim 6, wherein:

the coefficient kr, the coefficient kg, and the coefficient kb are within ranges that satisfy the inequalities below:

$$0.15 \leq \text{coefficient } kr \leq 0.35$$

$$0.55 \leq \text{coefficient } kg \leq 0.75$$

$$0 \leq \text{coefficient } kb \leq 0.2.$$

\* \* \* \* \*